(12) United States Patent
Wang et al.

(10) Patent No.: US 10,189,979 B2
(45) Date of Patent: *Jan. 29, 2019

(54) NUCLEATED PHTHALATE-FREE PP HOMOPOLYMERS FOR MELT-BLOWN FIBERS

(71) Applicant: BOREALIS AG, Vienna (AT)

(72) Inventors: Jingbo Wang, Linz (AU); Wilhelmus Henricus Adolf Sars, Tilburg (NL); Joachim Fiebig, St. Marien (AT); Henk Van Paridon, Averbode (BE); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 20 days.

This patent is subject to a terminal disclaimer.

(21) Appl. No.: 15/324,803

(22) PCT Filed: Jul. 6, 2015

(86) PCT No.: PCT/EP2015/065321
§ 371 (c)(1),
(2) Date: Jan. 9, 2017

(87) PCT Pub. No.: WO2016/008749
PCT Pub. Date: Jan. 21, 2016

(65) Prior Publication Data
US 2017/0198126 A1 Jul. 13, 2017

(30) Foreign Application Priority Data
Jul. 15, 2014 (EP) .................................. 14177132

(51) Int. Cl.
| | | |
|---|---|---|
| *C08L 23/12* | (2006.01) | |
| *D01F 6/06* | (2006.01) | |
| *D01D 5/098* | (2006.01) | |
| *D01F 1/10* | (2006.01) | |
| *C08J 3/22* | (2006.01) | |
| *D04H 1/4291* | (2012.01) | |
| *D04H 1/56* | (2006.01) | |
| *D04H 1/42* | (2012.01) | |
| *D04H 1/54* | (2012.01) | |
| *C08K 5/00* | (2006.01) | |

(52) U.S. Cl.
CPC .............. *C08L 23/12* (2013.01); *C08J 3/226* (2013.01); *C08K 5/0083* (2013.01); *D01D 5/0985* (2013.01); *D01F 1/10* (2013.01); *D01F 6/06* (2013.01); *D04H 1/42* (2013.01); *D04H 1/4291* (2013.01); *D04H 1/54* (2013.01); *D04H 1/56* (2013.01); *C08J 2323/12* (2013.01); *C08L 2203/12* (2013.01); *C08L 2205/025* (2013.01); *C08L 2205/24* (2013.01); *D10B 2321/022* (2013.01)

(58) Field of Classification Search
CPC .......... D01D 5/0985; D01F 1/10; C08J 3/226; C08J 2323/12; D04H 1/56; D04H 1/54; D04H 1/42; C08L 23/12; C08L 2303/12; C08L 2205/025; C08L 2205/24; C08K 5/0083; C08F 210/06; C08F 2/001; C08F 4/651; D10B 2321/022
See application file for complete search history.

(56) References Cited

U.S. PATENT DOCUMENTS

| | | | |
|---|---|---|---|
| 5,039,748 A | 8/1991 | Wakatsuki et al. | |
| 9,828,698 B2 * | 11/2017 | Wang et al. | C08F 110/06 |
| 2006/0183860 A1 * | 8/2006 | Mehta et al. | C08L 23/10 525/191 |
| 2010/0301059 A1 | 12/2010 | Kaarto et al. | |
| 2017/0314172 A1 * | 11/2017 | Fiebig et al. | D04H 1/56 |

FOREIGN PATENT DOCUMENTS

| | | |
|---|---|---|
| CN | 103619942 | 3/2014 |
| EP | 0316187 | 5/1989 |
| EP | 887379 | 6/1998 |
| EP | 887380 | 6/1998 |
| EP | 887381 | 6/1998 |
| EP | 1 028 984 | 8/2000 |
| EP | 991684 | 12/2000 |
| EP | 1 183 307 | 3/2002 |
| EP | 2 338 931 | 6/2011 |
| EP | 2610271 | 12/2011 |
| EP | 2610272 | 12/2011 |
| EP | 2 535 372 | 12/2012 |
| EP | 2535372 | 12/2012 |
| JP | H01156561 | 6/1989 |
| JP | H01229806 | 9/1989 |
| JP | 2011507989 | 10/2011 |
| WO | 92/12182 | 7/1992 |
| WO | 98/58977 | 12/1998 |
| WO | 99/24478 | 5/1999 |
| WO | 9924479 | 5/1999 |
| WO | 00/68315 | 11/2000 |
| WO | 2004/000899 | 12/2003 |
| WO | 2004/111095 | 12/2004 |

(Continued)

OTHER PUBLICATIONS

Office Action dated Dec. 18, 2017 for JP2016-575963 with English translation, 8 pages.

(Continued)

*Primary Examiner* — Nathan M Nutter
(74) *Attorney, Agent, or Firm* — Lowenstein Sandler LLP

(57) ABSTRACT

The present invention is directed to a new polypropylene composition comprising a propylene homopolymer and a polymeric nucleating agent, to melt-blown fibers comprising the polypropylene composition, to a melt-blown web comprising the melt-blown fibers and/or the polypropylene composition, to an article comprising the melt-blown fibers and/or the melt-blown web as well as to the use of the polypropylene composition for improving the relation between pressure drop and hydrohead of a melt-blown web and for improving the thermo-mechanical properties of a melt-blown web in machine direction (MD) and transverse direction (TD).

18 Claims, 1 Drawing Sheet

(56) References Cited

FOREIGN PATENT DOCUMENTS

| WO | 2007126961 | 11/2007 |
|---|---|---|
| WO | 2009077467 | 6/2009 |
| WO | 2011092092 | 8/2011 |
| WO | 2012/007430 | 1/2012 |
| WO | 2012055797 | 5/2012 |

OTHER PUBLICATIONS

Busico, V., et al., "Microstructure of prolypropylene," Progress in Polymer Science, 2001, pp. 443-533, 26, Elsevier.

Busico, V., et al., "Alk-1-ene Polymerization in the Presence of a Monocyclopentadienyl Zirconium(iv) Acetamidinate Catalyst: Microstructural and Mechanistic Insights," Maromolecular Rapid Communications, 2007, pp. 1128-1134, 28, Wiley-VCH Verlag GmbH & Co. KGaA, Weinheim.

Busico, V., et al., "Full Assignment of the 13C NMR Spectra of Regioregular Polypropylenes: Methyl and Methylene Region," Macromolecules, 1997, pp. 6251-6263, 30, American Chemical Society.

Cheng, H.N., "13C NMR Analysis of Ethylene-Propylene Rubbers," Macromolecules, 1984, pp. 1950-1955, 17, Hercules Incorporate, Delaware.

Resconi, L, et al., " Selectivity in Propene Polymerization with Metallocene Catalysts," Chemical Reviews, 2000, pp. 1253-1345, 100, American Chemical Society.

Wang W., et al., "Structural Analysis of Ethylene/Propylene Copolymers Synthesized with a Constrained Geometry Catalyst," Macromolecules, 2000, pp. 1157-1162, 33, American Chemical Society.

Zhou, Z., et al., "A new decoupling method for accurate quantification of polyethylene copolymer composition and triad sequence distribution with 13C NMR," Journal of Magnetic Resonance, 2007, pp. 225-233, 187, Elsevier.

International Search Report for International Application No. PCT/EP2015/065321 dated Sep. 15, 2015, 9 pgs.

Translation of Chinese Office Action for patent application No. 201580034544.2 dated Mar. 19, 2018, 7 pages.

\* cited by examiner

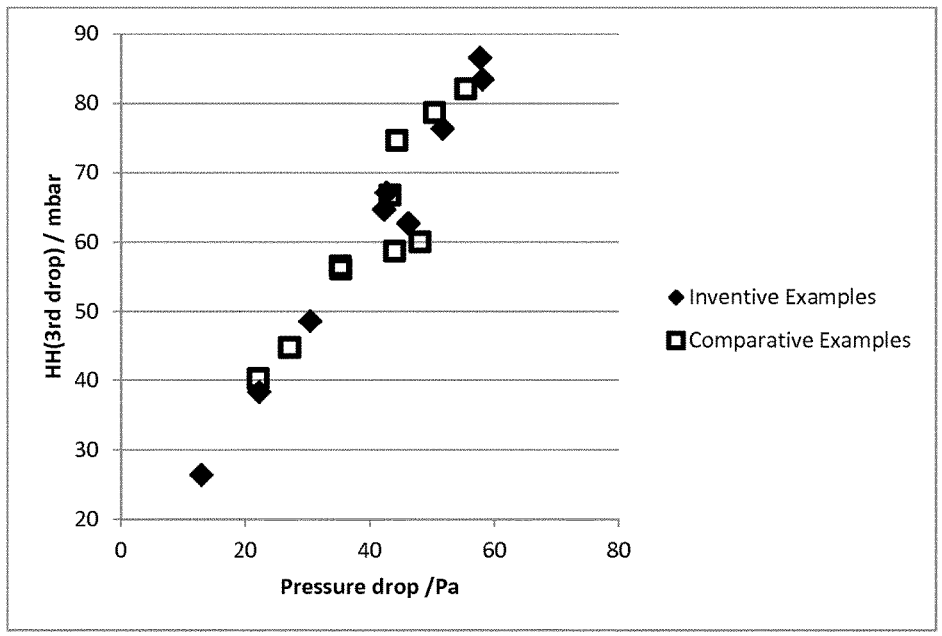
Figure 1: melt-blown web performance with regard to the relation between pressure drop and hydrohead at a weight per unit area of 9.5 ± 1.0 g/m$^2$
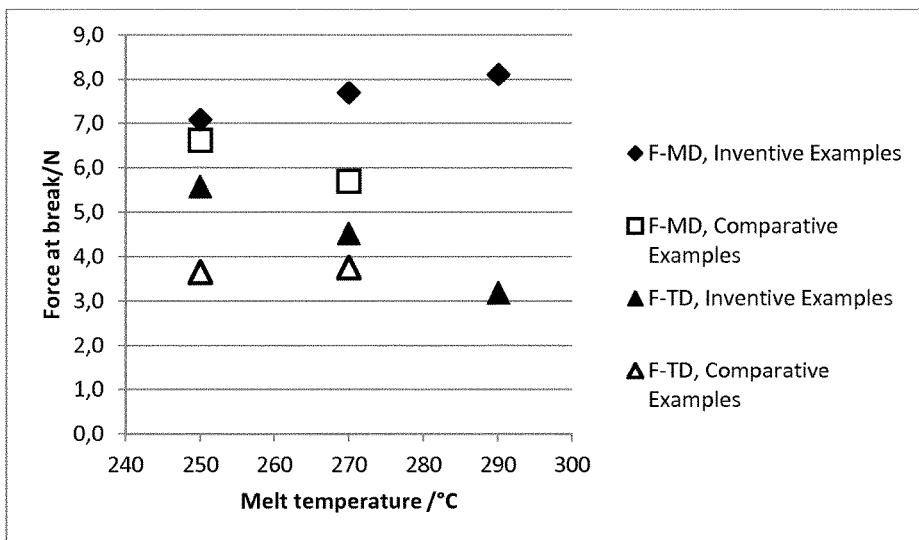
Figure 2: mechanical properties of the webs

NUCLEATED PHTHALATE-FREE PP HOMOPOLYMERS FOR MELT-BLOWN FIBERS

CROSS-REFERENCE TO RELATED APPLICATION(S)

This application is a national phase of International Application No. PCT/EP2015/065321, filed on Jul. 6, 2015, which claims the benefit of European Patent Application No. 14177132.9,filed on Jul. 15, 2014. The contents of these applications are hereby incorporated by reference in their entirety.

SUMMARY

The present invention is directed to a new polypropylene composition comprising a propylene homopolymer and a polymeric nucleating agent, to melt-blown fibers comprising the polypropylene composition, to a melt-blown web comprising the melt-blown fibers and/or the polypropylene composition, to an article comprising the melt-blown fibers and/or the melt-blown web as well as to the use of the polypropylene composition for improving the relation between pressure drop and hydrohead as well as thermo-mechanical properties of a melt-blown web.

A melt-blown web, being a non-woven structure consisting of melt-blown fibers, is typically made in a one-step process in which high-velocity air blows a molten thermoplastic resin from an extruder die tip onto a conveyor or take-up screen to form fine fibered self-bonding web. Although many types of polymers can be employed for melt-blown fibers and fabrics, polypropylene is one of the most commonly used polymers. Normally for the manufacture of melt-blown fibers and webs propylene homopolymers are used which have been prepared by using Ziegler-Natta (ZN) catalysts; especially Ziegler-Natta (ZN) catalysts comprising a specific class of internal donors, namely phthalate compounds. However, some of these compounds are under suspicion of generating negative health and environmental effects and will probably be banned in the European Union in the future. Furthermore, there is an increasing demand on the market for "phthalate-free polypropylene" suitable for fiber applications in the hygiene/personal care market and in the filtration field.

On the other side, the performance of polypropylene non-woven webs based on melt-blown (MB) fibers or SMS fabrics (spunbonded/melt-blown/spunbonded) still needs to be improved. For example, a good balance between pressure drop and hydrohead (water barrier) of these systems is desired. Furthermore it is desired that the thermo-mechanical properties of these webs in machine direction (MD) and transverse direction (TD) are improved, especially at higher application temperatures.

For example in the field of filtrations a higher temperature resistance is required. As is known in the state of the art, nucleation is one way of improving the temperature resistance. However, one problem in fiber nucleation is the nature of the nucleating agent. The typical size of nucleating agents, like Sodium 2,2'-methylene bis-(4,6-di-tert. butyl-phenyl) phosphate (e.g. NA-11; supplier Adeka Corporation), which is i.a. disclosed in WO 2012055797 as suitable alpha-nucleating agent for producing melt-blown PP fibers, is about 3 to 5 µm, which is larger than the usual fiber diameter of 1-2 µm for melt-blown fibers suitable in the field of filtration and hygiene, limiting the use in these applications and also reducing the possibility to produce thinner fibers. Moreover, dispersion of such nucleating agents into a melt with very low viscosity is also a challenge. In case that beta-nucleating agents, as also described in WO 2012055797, are used for producing melt-blown PP fibers, their respective thermo-mechanical stability will be reduced by the inherently lower melting point of the beta-modification of PP in addition to the aforementioned problems.

Thus, the object of the present invention was to provide a polymer composition based on phthalate free ZN-catalysts, which is suitable for the preparation of melt-blown fibers and webs with an improved or optimized relation between pressure drop and hydrohead and improved thermo-mechanical properties.

The finding of the present invention is that with a propylene homopolymer, being produced in the presence of a Ziegler-Natta catalyst containing an internal donor (ID) not belonging to the class of phthalate compounds and comprising a polymeric nucleating agent, an improved or optimized relation between pressure drop and hydrohead and improved thermo-mechanical properties are achieved when processed into melt-blown fibers and webs.

Thus, the present invention is directed to a polypropylene composition suitable for the production of melt-blown PP fibers comprising (A) a propylene homopolymer, produced with a Ziegler-Natta catalyst (ZN-C), and
(B) a polymeric nucleating agent,
wherein the polypropylene composition has
   i) a melt flow rate MFR$_2$ (230° C./2.16 kg) measured according to ISO 1133 of 90 to 5000 g/10 min, and
   ii) a difference between melting temperature (Tm) and crystallization temperature (Tc) (Tm−Tc) of <45° C.

In a preferred embodiment the polypropylene composition is free of phthalic compounds as well as their respective decomposition products.

In a further embodiment of the present invention, the polypropylene composition and/or propylene homopolymer has/have been visbroken.

According to this embodiment of the present invention, the polypropylene composition and/or propylene homopolymer has/have been visbroken with a visbreaking ratio [final MFR$_2$ (230° C./2.16 kg)/initial MFR$_2$ (230° C./2.16 kg)] of 5 to 50, wherein "final MFR$_2$ (230° C./2.16 kg)" is the MFR$_2$ (230° C./2.16 kg) of the polypropylene composition and/or propylene homopolymer after visbreaking and "initial MFR$_2$ (230° C./2.16 kg)" is the MFR$_2$ (230° C./2.16 kg) of the polypropylene composition and/or propylene homopolymer before visbreaking.

In another embodiment of the present invention, the propylene homopolymer has been polymerized in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is preferably a non-phthalic compound, more preferably a non-phthalic acid ester; b) optionally a co-catalyst (Co), and c) optionally an external donor (ED). It is most preferred that a) the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate; b) the molar ratio of co-catalyst (Co) to external donor (ED) [Co/ED] is 5 to 45.

In yet another embodiment of the present invention, the propylene homopolymer is produced in at least one reactor (R1) or in a sequential polymerization process comprising at least two reactors (R1) and (R2), whereby in the first reactor (R1) a first propylene homopolymer fraction (H-PP1) is produced, which is subsequently transferred into the second reactor (R2), and wherein in the second reactor (R2) a second propylene homopolymer fraction (H-PP2) is produced in the presence of the first propylene homopolymer fraction (H-PP1).

The present invention is also directed to melt-blown fibers having an average diameter of not more than 5.0 µm, said fibers comprising a, preferably comprising at least 95.0 wt % of a polypropylene composition as defined herein.

The present invention is further directed to a melt-blown web comprising the melt-blown fibers and/or the polypropylene composition as defined herein.

The present invention is also directed to an article comprising the melt-blown fibers and/or a melt-blown web, wherein said article is selected from the group consisting of filtration media, diapers, sanitary napkins, panty liners, incontinence products for adults, protective clothing, breathing protection masks, surgical drapes, surgical gowns, and surgical wear in general.

The present invention is further directed to the use of a polypropylene composition as defined herein for improving the relation between pressure drop and hydrohead of a melt-blown web at an air permeability in the range from 500 to 2000 mm/s, wherein the improvement is defined by inequation (I)

$$(PD\text{-web})/(HH\text{-web}) \leq 0.88 \quad (I)$$

wherein (PD-web) is the pressure drop (Pa), measured according to DIN ISO 9237, of a melt-blown web having a weight per unit area of $9.5 \pm 1.0$ g/m$^2$, (HH-web) is the hydrohead ($3^{rd}$ drop, cm H$_2$O resp. mbar), measured according to standard test WSP 80.6 (09), of a melt-blown web having a weight per unit area of $9.5 \pm 1.0$ g/m$^2$, and for improving the thermo-mechanical properties of a melt-blown web in machine direction (MD) and transverse direction (TD).

BRIEF DESCRIPTION OF THE DRAWINGS

FIG. 1 shows melt-blown web performance with regard to the relation between pressure drop and hydrohead for the inventive and comparative examples; and FIG. 2 shows the mechanical properties of webs of the inventive and comparative examples.

DETAILED DESCRIPTION

In the following the invention is described in more detail.

The polypropylene composition according to the present invention comprises as component (A) a propylene homopolymer and as component (B) a polymeric nucleating agent.

Component (A): Propylene Homopolymer

According to the present invention the expression "propylene homopolymer" relates to a polypropylene that consists substantially, i.e. of at least 99.0 wt %, more preferably of at least 99.5 wt %, still more preferably of at least 99.8 wt %, like of at least 99.9 wt %, of propylene units. In another embodiment only propylene units are detectable, i.e. only propylene has been polymerized.

One requirement of the propylene homopolymer is a melt flow rate MFR$_2$ (230° C./2.16 kg) measured according to ISO 1133 in the range of 90 to 5000 g/10 min, preferably in the range of 100 to 4500 g/10 min, more preferably in the range of 120 to 4000 g/10 min, yet more preferably in the range of 140 and 3500 g/10 min.

In a preferred embodiment the propylene homopolymer has been visbroken. In this case the propylene homopolymer has a rather high melt flow rate, which differ(s) from other polymers used for instance in the melt blown technique to produce fibers. Accordingly, it is preferred that in the present invention the propylene homopolymer has a melt flow rate MFR$_2$ (230° C./2.16 kg) measured according to ISO 1133 of 400 g/10 min to 3000 g/10 min, more preferably in the range from 450 to 2500 g/10 min and most preferably in the range from 500 to 2000 g/10 min.

Accordingly, the melt flow rate (230° 012.16 kg) of the propylene homopolymer in the polypropylene composition before visbreaking is much lower, like from 5 to 400 g/10 min. For example, the melt flow rate (230° C./2.16 kg) of the propylene homopolymer before visbreaking is from 10 to 200 g/10 min, like from 40 to 150 g/10 min.

In this embodiment of the present invention, the propylene homopolymer has been visbroken with a visbreaking ratio [final MFR$_2$ (230° 012.16 kg)/initial MFR$_2$ (230° 012.16 kg)] of 5 to 50, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking. Preferably, the propylene homopolymer has been visbroken with a visbreaking ratio [final MFR$_2$ (230° C./2.16 kg)/initial MFR$_2$ (230° C./2.16 kg)] of 5 to 25, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking. More preferably, the propylene homopolymer has been visbroken with a visbreaking ratio [final MFR$_2$ (230° C./2.16 kg)/initial MFR$_2$ (230° C./2.16 kg)] of 5 to 15, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking.

As mentioned above, it is preferred that the propylene homopolymer has been visbroken. Preferred mixing devices suited for visbreaking are discontinuous and continuous kneaders, twin screw extruders and single screw extruders with special mixing sections and co-kneaders.

By visbreaking the propylene homopolymer with heat or at more controlled conditions with peroxides, the molar mass distribution (MWD) becomes narrower because the long molecular chains are more easily broken up or scissored and the molar mass M, will decrease, corresponding to an MFR$_2$ increase. The MFR$_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of polypropylene composition and/or propylene homopolymer to be subjected to visbreaking, the $MFR_2$ (230° C./2.16 kg) value of the polypropylene composition and/or the propylene homopolymer to be subjected to visbreaking and the desired target $MFR_2$ (230° C./2.16 kg) of the product to be obtained. Accordingly, typical amounts of peroxide visbreaking agent are from 0.005 to 0.7 wt %, more preferably from 0.01 to 0.4 wt %, based on the total amount of polymers in the polypropylene composition, more preferably based on the total amount of propylene homopolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

Component (A) of inventive polypropylene composition is preferably obtained by visbreaking the propylene homopolymer, preferably visbreaking by the use of peroxide.

More precisely, the inventive polypropylene composition may be obtained by visbreaking the propylene homopolymer, preferably by the use of peroxide as mentioned above, in an extruder.

After visbreaking the polypropylene homopolymer according to this invention is preferably in the form of pellets or granules.

The propylene homopolymer is further defined by its microstructure.

Unless otherwise indicated, throughout the instant invention, the melting/crystallization behavior, xylene cold soluble content (XCS), isotacticity and the amount of <2,1> regiodefects as defined below for the polypropylene composition and the propylene homopolymer, respectively, is preferably the melting/crystallization behavior, xylene cold soluble content (XCS), isotacticity and the amount of <2,1> regiodefects of the polypropylene composition and the propylene homopolymer, respectively, after visbreaking.

Preferably the propylene homopolymer is isotactic. Accordingly, it is preferred that the polypropylene homopolymer has a rather high pentad concentration (mmmm %) i.e. more than 90.0%, more preferably more than 93.0%, like more than 93.0 to 98.5%, still more preferably at least 93.5%, like in the range of 93.5 to 98.0%.

A further characteristic of the propylene homopolymer is the low amount of misinsertions of propylene within the polymer chain, which indicates that the propylene homopolymer is produced in the presence of a Ziegler-Natta catalyst, preferably in the presence of a Ziegler-Natta catalyst (ZN-C) as defined in more detail below. Accordingly, the propylene homopolymer is preferably featured by low amount of 2,1 erythro regio-defects, i.e. of equal or below 0.4 mol %, more preferably of equal or below than 0.2 mol %, like of not more than 0.1 mol %, determined by $^{13}C$-NMR spectroscopy. In an especially preferred embodiment no 2,1 erythro regio-defects are detectable.

It is preferred that the propylene homopolymer is featured by rather high cold xylene soluble (XCS) content, i.e. by a xylene cold soluble (XCS) of at least 1.8 wt %, like at least 2.0 wt %. Accordingly, the propylene homopolymer has preferably a xylene cold soluble content (XCS) in the range of 1.8 to 5.5 wt %, more preferably in the range of 2.0 to 5.0 wt %.

The amount of xylene cold solubles (XCS) additionally indicates that the propylene homopolymer is preferably free of any elastomeric polymer component, like an ethylene propylene rubber. In other words, the propylene homopolymer shall not be a heterophasic polypropylene, i.e. a system consisting of a polypropylene matrix in which an elastomeric phase is dispersed. Such systems are featured by a rather high xylene cold soluble content.

The propylene homopolymer suitable for the composition of this invention has no glass transition temperature below −30° C., preferably below −25° C., more preferably below −20° C.

In one preferred embodiment the propylene homopolymer suitable for the composition of this invention has a glass transition temperature in the range of −12° C. to 5° C., more preferably in the range of −10° C. to 4° C.

Further, the propylene homopolymer is preferably a crystalline propylene homopolymer. The term "crystalline" indicates that the propylene homopolymer has a rather high melting temperature. Accordingly throughout the invention the propylene homopolymer is regarded as crystalline unless otherwise indicated. Therefore, the propylene homopolymer has a melting temperature Tm measured by differential scanning calorimetry (DSC) of equal or more than 150° C., i.e. of equal or more than 150° C. to 168° C., more preferably of at least 155° C., i.e. in the range of 155° C. to 166° C.

Further it is preferred that the propylene homopolymer has a crystallization temperature Tc measured by differential scanning calorimetry (DSC) of equal or more than 110° C., more preferably in the range of 110° C. to 135° C., more preferably in the range of 114° C. to 130° C.

The propylene homopolymer is obtained by polymerizing propylene in the presence of a Ziegler-Natta catalyst as defined below. Preferably, the propylene homopolymer according to this invention is obtained by a process as defined in detail below by using the Ziegler-Natta catalyst.

The propylene homopolymer can comprise at least one propylene homopolymer fraction or two propylene homopolymer fractions, namely a first propylene homopolymer fraction (H-PP1) and a second propylene homopolymer fraction (H-PP2). Preferably the weight ratio between the first propylene homopolymer fraction (H-PP1) and the second propylene homopolymer fraction (H-PP2) [(H-PP1):(H-PP2)] is 70:30 to 40:60, more preferably 65:35 to 45:55.

The first propylene homopolymer fraction (H-PP1) and the second propylene homopolymer fraction (H-PP2) may differ in the melt flow rate. However, it is preferred that the melt flow rate $MFR_2$ (230° C.) of the first propylene homopolymer fraction (H-PP1) and of the second propylene homopolymer fraction (H-PP2) are nearly identical, i.e. differ not more than 15% as calculated from the lower of the two values, preferably differ not more than 10%, like differ not more than 7%.

The propylene homopolymer according to this invention is produced in the presence of
(a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is preferably a non-phthalic compound, more preferably a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

Preferably, the propylene homopolymer is prepared by a polymerization process as further described below comprising at least one reactor (R1) and optionally a second reactor (R2), wherein in the first reactor (R1) the first propylene homopolymer fraction (H-PP1) is produced which is optionally subsequently transferred into the second reactor (R2), whereby in the second reactor (R2) the optional second propylene homopolymer fraction (H-PP2) is produced in the presence of the first propylene homopolymer fraction (H-PP1).

The process for the preparation of the propylene homopolymer as well as the Ziegler-Natta catalyst (ZN-C) used in said process are further described in detail below.

In view of the above, it is appreciated that the propylene homopolymer is free of phthalic compounds as well as their respective decomposition products, i.e. phthalic acid esters, typically used as internal donor of Ziegler-Natta (ZN) catalysts. Preferably, the propylene homopolymer is free of phthalic compounds as well as their respective decomposition products, i.e. phthalic compounds typically used as internal donor of Ziegler-Natta (ZN) catalysts.

The term "free of" phthalic compounds in the meaning of the present invention refers to a propylene homopolymer in which no phthalic compound, like phthalic acid esters as well no respective decomposition products, preferably no phthalic compounds as well as no respective decomposition products at all, are detectable.

As the polypropylene composition is dominated by the propylene homopolymer the polypropylene composition is preferably also free of phthalic compounds as well as their respective decomposition products, more preferably of phthalic acid esters as well as their respective decomposition products.

For the same reasons, the values concerning melt flow rate (MFR$_2$), xylene cold soluble content (XCS), isotacticity and the amount of <2,1> regiodefects as defined above for the propylene homopolymer are equally applicable for the polypropylene composition.

As already indicated above, the propylene homopolymer is optionally produced in a sequential polymerization process.

The term "sequential polymerization system" indicates that the propylene homopolymer is produced in at least two reactors connected in series.

Accordingly, the present polymerization system comprises at least a first polymerization reactor (R1) and optionally a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, at least one of the two polymerization reactors (R1) and (R2) is a gas phase reactor (GPR). Still more preferably the optional second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of the first fraction ($1^{st}$ F) of the propylene homopolymer (i.e. the first propylene homopolymer fraction (H-PP1)), in the polymer slurry within the loop reactor (LR) is typically from 15 wt % to 55 wt %, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt % to 55 wt % and more preferably from 25 wt % to 52 wt %, based on the total weight of the polymer slurry within the loop reactor (LR).

Preferably the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the optional second polymerization reactor (R2) and any optional subsequent reactor, like the third polymerization reactor (R3), are gas phase reactors (GPRs). Accordingly for the instant process at least one, preferably one or two polymerization reactors (R1) and (R2) or three polymerization reactors (R1), (R2) and (R3), namely a slurry reactor (SR), like loop reactor (LR) and a optional (first) gas phase reactor (GPR1) and optionally a second gas phase reactor (GPR2), connected in series are used. If needed prior to the slurry reactor (SR) a pre-polymerization reactor is placed.

The Ziegler-Natta catalyst (ZN-C) is fed into the first polymerization reactor (R1) and is transferred with the polymer (slurry) obtained in the first polymerization reactor (R1) into the optional subsequent reactors.

If the process covers also a pre-polymerization step it is preferred that all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

A preferred multistage process is a "loop-gas phase"-process, such as developed by Borealis (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62° C. to 85° C., more preferably in the range of 65° C. to 82° C., still more preferably in the range of 67° C. to 80° C.

Alternatively or additionally to the previous paragraph it is preferred that the operating temperature in the second polymerization reactor (R2) and optional in the third reactor (R3) is in the range of 75° C. to 95° C., more preferably in the range of 78° C. to 92° C.

Preferably the operating temperature in the second polymerization reactor (R2) is equal to or higher than the operating temperature in the first polymerization reactor (R1). Accordingly it is preferred that the operating temperature (a) in the first polymerization reactor (R1) is in the range of 62° C. to 85° C., more preferably in the range of 65° C. to 82° C., still more preferably in the range of 67° C. to 80° C., like 70° C. to 80° C.;

and (b) in the second polymerization reactor (R2) is in the range of 75° C. to 95° C., more preferably in the range of 78° C. to 92° C., still more preferably in the range of 78° C. to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time (τ) is defined as the ratio of the reaction volume ($V_R$) to the volumetric outflow rate from the reactor ($Q_o$) (i.e. $V_R/Q_o$), i.e τ=$V_R/Q_o$ [tau=$V_R/Q_o$]. In case of a loop reactor the reaction volume ($V_R$) equals to the reactor volume.

Accordingly the average residence time (τ) in the first polymerization reactor (R1) is preferably at least 15 min, more preferably in the range of 15 to 80 min, still more preferably in the range of 20 to 60 min, like in the range of 24 to 50 min, and/or the average residence time (τ) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time (τ) in the third polymerization reactor (R3)—if present—is preferably at least 30 min, more preferably in the range of 30 to 120 min, still more preferably in the range of 40 to 100 min, like in the range of 50 to 90 min.

As mentioned above the preparation of the propylene homopolymer can comprise in addition to the (main) polymerization of the propylene homopolymer in the at least one polymerization reactors (R1, and optional R2 and R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0° C. to 60° C., preferably from 15° C. to 50° C., and more preferably from 20° C. to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final propylene copolymer (R-PP) is rather low and typically not more than 5.0 wt %, more preferably not more than 4.0 wt %, still more preferably in the range of 0.5 to 4.0 wt %, like in the range 1.0 of to 3.0 wt %.

In case that pre-polymerization is not used, propylene and the other ingredients such as the Ziegler-Natta catalyst (ZN-C) are directly introduced into the first polymerization reactor (R1).

Accordingly, the propylene homopolymer is preferably produced in a process comprising the following steps under the conditions set out above (a) in the first polymerization reactor (R1), i.e. in a loop reactor (LR), propylene is polymerized obtaining a first propylene homopolymer fraction (H-PP1) of the propylene homopolymer (H-PP), (b) optionally transferring said first propylene homopolymer fraction (H-PP1) to a second polymerization reactor (R2), (c) whereby in the second polymerization reactor (R2) propylene is polymerized in the presence of the first propylene homopolymer fraction (H-PP1) obtaining a second propylene homopolymer fraction (H-PP2) of the propylene homopolymer, said first propylene homopolymer fraction (H-PP1) and said second propylene homopolymer fraction (H-PP2) form the propylene homopolymer.

A pre-polymerization as described above can be accomplished prior to step (a).

The Ziegler-Natta Catalyst (ZN-C), the External Donor (ED) and the Co-Catalyst (Co)

As pointed out above in the specific process for the preparation of the propylene homopolymer as defined above a Ziegler-Natta catalyst (ZN-C) must be used. Accordingly the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being preferably a non-phthalic compound, more preferably a non-phthalic acid ester, still more preferably being a diester of non-phthalic dicarboxylic acids as described in more detail below. Thus, the catalyst is preferably fully free of undesired phthalic compounds. Further, the solid catalyst is free of any external support material, like silica or $MgCl_2$, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of a)
  $a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or
  $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or
  $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; or
  $a_4$) providing a solution of Group 2 alkoxide of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \le n<2$, $0 \le m<2$ and $n+m+(2-n-m)=2$, provided that both n and $m \ne 0$, $0<n' \le 2$ and $0<m' \le 2$; and b) adding said solution from step a) to at least one compound (TC) of a transition metal of Group 4 to 6 and c) obtaining the solid catalyst component particles, and adding a internal electron donor (ID), preferably a non-phthalic internal donor (ID), at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2- ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)$_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m$^2$, more preferably below 10 g/m$^2$. Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

$$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

Component (B) Polymeric Nucleating Agent

As component (B) a polymeric nucleating agent, preferably a polymer of vinyl compound, more preferably a polymeric nucleating agent obtainable by polymerizing vinylcycloalkane monomers or vinylalkane monomers is used.

The polymeric nucleating agent is more preferably a polymerized vinyl compound according to the following formula $$CH_2=CH-CHR^1R^2 \qquad (II)$$

wherein $R^1$ and $R^2$ together form a 5- or 6-membered saturated, unsaturated or aromatic ring, optionally containing substituents, or independently represent an alkyl group comprising 1 to 4 carbon atoms, whereby in case $R^1$ and $R^2$ form an aromatic ring, the hydrogen atom of the —$CHR^1R^2$ moiety is not present.

Even more preferably, nucleating agent is selected from: vinyl cycloalkane polymer, preferably vinyl cyclohexane (VCH) polymer, vinyl cyclopentane polymer, 3-methyl-1-butene polymer and vinyl-2-methyl cyclohexane polymer. The most preferred nucleating agent is vinyl cyclohexane (VCH) polymer.

As mentioned above, in a preferred embodiment, nucleating agent is a polymeric nucleating agent, more preferably a polymer of vinyl compound according to formula (I) as defined above, even more preferably vinyl cyclohexane (VCH) polymer.

The amount of nucleating agent preferably is not more than 10000 ppm by weight (means parts per million based on the total weight of the polypropylene composition (100 wt %), also abbreviated herein shortly as ppm), more preferably not more than 6000 ppm, even more preferably not more than 5000 ppm, based on the total weight of the polypropylene composition (100 wt %).

The amount of the nucleating agent still more preferably is not more than 500 ppm, preferably is from 0.025 to 200 ppm, and more preferably is from 0.1 to 200 ppm, more preferably is from 0.3 to 200 ppm, most preferably is from 0.3 to 100 ppm, based on the total weight of the polypropylene composition (100 wt %).

In the preferred embodiment the nucleating agent is a polymeric nucleating agent, most preferably a polymer of vinyl compound according to formula (II) as defined above, even more preferably vinyl cyclohexane (VCH) polymer as defined above, and the amount of said nucleating agent (B) is not more than 200 ppm, more preferably is from 0.025 to 200 ppm, and more preferably is from 0.1 to 200 ppm, more preferably is from 0.3 to 200 ppm, most preferably is from 0.3 to 100 ppm, based on the total weight of the polypropylene composition (100 wt %).

The nucleating agent may be introduced to the propylene homopolymer (A) e.g. during the polymerization process of the propylene homopolymer (A) or may be incorporated to the propylene homopolymer (A) by mechanical blending with a nucleated polymer, containing the polymeric nucleating agent (so-called master batch technology) or by mechanical blending of the propylene homopolymer (A) with the nucleating agent as such.

Thus, the nucleating agent can be introduced to the propylene homopolymer (A) during the polymerization process of the propylene homopolymer (A). The nucleating agent is preferably introduced to the propylene homopolymer (A) by first polymerizing the above defined vinyl compound according to formula (II) as defined above, even more preferably vinyl cyclohexane (VCH), in the presence of a catalyst system as described above, comprising a solid Ziegler Natta catalyst component, a cocatalyst and optional external donor, and the obtained reaction mixture of the polymer of the vinyl compound according to formula (II) as defined above, even more preferably vinyl cyclohexane (VCH) polymer, and the catalyst system is then used for producing the propylene homopolymer (A).

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step.

Further, the reaction time of the catalyst modification by polymerization of a vinyl compound should be sufficient to allow for complete reaction of the vinyl monomer, i. e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 70° C., preferably 35 to 65° C.

This catalyst modification step is known as BNT-technology and is performed during the above described pre-polymerization step in order to introduce the polymeric nucleating agent.

General preparation of such modified catalyst system vinyl compound (II) is disclosed e.g. in EP 1 028 984 or WO 00/6831.

Preferably the polymeric nucleating agent is added with the so called masterbatch technology, where an already nucleated polymer, preferably a propylene homopolymer, containing the polymeric nucleating agent (masterbatch) is blended with the propylene homopolymer (A).

Such a masterbatch is preferably prepared by polymerizing propylene in a sequential polymerization process.

The term "sequential polymerization system" indicates that the propylene homopolymer is produced in at least two reactors connected in series. Accordingly, the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of the first fraction ($1^{st}$ F) of the propylene homopolymer (i.e. the first propylene homopolymer fraction (H-PP1)), in the polymer slurry within the loop reactor (LR) is typically from 15 wt % to 55 wt %, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt % to 55 wt % and more preferably from 25 wt % to 52 wt %, based on the total weight of the polymer slurry within the loop reactor (LR).

Preferably the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used.

Furthermore the process comprises a prepolymerization step in which the above defined polymeric nucleating agent, preferably the vinyl compound according to formula (II) as defined above, even more preferably vinyl cyclohexane (VCH), is first polymerized in the presence of a catalyst system as described for component (A), comprising a solid Ziegler Natta catalyst component, a cocatalyst and optional external donor.

The so obtained reaction mixture of the polymer of the vinyl compound according to formula (II) as defined above, even more preferably vinyl cyclohexane (VCH) polymer, and the catalyst system is then introduced in the first polymerization reactor (R1).

The modification of the catalyst system with the polymeric nucleation agent, so called BNT-technology is described above.

The produced propylene homopolymer, containing the polymeric nucleating agent, is the so called carrier polymer.

If the nucleating agent is added in the form of a masterbatch together with a carrier polymer, the concentration of the nucleating agent in the masterbatch is at least 10 ppm, typically at least 15 ppm. Preferably this nucleating agent is present in the masterbatch in a range of from 10 to 2000 ppm, more preferably more than 15 to 1000 ppm, such as 20 to 500 ppm.

As described above, the carrier polymer is preferably a propylene homopolymer, produced with a catalyst system as described above for component (A) and having an $MFR_2$ (230° C., 2.16 kg) in the range of 1.0 to 800 g/10 min, preferably 1.5 to 500 g/10 min, more preferably 2.0 to 200 g/10 min and most preferably 2.5 to 150 g/10 min.

More preferably, the carrier polymer is an isotactic propylene homopolymer having a melting point very similar to the above defined propylene homopolymer as component (A). Therefore, the carrier polymer has a melting temperature Tm measured by differential scanning calorimetry (DSC) of equal or more than 150° C., i.e. of equal or more than 150 to 168° C., more preferably of at least 155° C., i.e. in the range of 155 to 166° C.

If the nucleating agent is added in the form of a masterbatch, the amount of masterbatch added is in the range of 1.0 to 10 wt %, preferably 1.5 to 8.5 wt % and more preferably 2.0 to 7.0 wt %, based on the total weight of the polypropylene composition.

Polypropylene Composition

The inventive polypropylene composition comprises the above defined propylene homopolymer as component (A) and the above defined polymeric nucleating agent as component (B).

As mentioned above, values concerning melt flow rate ($MFR_2$), xylene cold soluble content (XCS), isotacticity and the amount of <2,1> regiodefects as defined above for the propylene homopolymer are equally applicable for the polypropylene composition.

The same is true for the melting temperature of the propylene homopolymer which is also equally applicable for the polypropylene composition.

The crystallization temperature of the nucleated polypropylene composition is higher than the crystallization temperature of the propylene homopolymer used as component (A), if the polymeric nucleating agent is added to the propylene homopolymer in the form of a masterbatch after the polymerization process for producing the propylene homopolymer.

If the polymeric nucleating agent is introduced to the propylene homopolymer by the use of a catalyst system modified by the BNT-technology as described above, the crystallization temperature of the propylene homopolymer is also equally applicable for the polypropylene composition.

Thus, the polypropylene composition according to the invention has i) a melt flow rate $MFR_2$ (230° C.12.16 kg) measured according to ISO 1133 of 90 to 5000 g/10 min, as described above for the propylene homopolymer (including preferred ranges)

ii) and a difference between melting temperature (Tm) and crystallization temperature (Tc)

(Tm–Tc) of <45° C., preferably <43° C., more preferably <42° C. and most preferably <40° C.

In a preferred embodiment the composition is free of phthalic compounds as well as their respective decomposition products, as described above for the propylene homopolymer.

The polypropylene composition of the present invention may comprise further components, i.e. further additives known in the art of not more than 5.0 wt %, like not more than 3.0 wt %, not including the amount of the optional masterbatch for introducing the polymeric nucleating agent.

For instance, the inventive polypropylene composition may comprise additionally small amounts of additives selected from the group consisting of antioxidants, stabilizers, fillers, colorants and antistatic agents. In general, they are incorporated during granulation of the pulverulent product obtained in the polymerization.

The instant polypropylene composition is preferably used in pellet or granule form for the preparation of the melt-blown fibers or melt-blown web or article.

Furthermore, the present invention is also directed to melt-blown fibers made from the polypropylene composition as defined above. Thus, the present invention is in particular directed to melt-blown fibers having an average filament fineness of not more than 5 µm. Furthermore, the melt-blown fibers preferably comprise at least 95.0 wt % based on the total weight of the melt-blown fibers, more preferably consists of, of the polypropylene composition as defined above.

The present invention is not only directed to melt-blown fibers as such but also to articles, like webs (MBW), made thereof. Accordingly the present invention is also directed to a melt-blown web comprising the melt-blown fibers and/or the polypropylene composition as defined above. Further, the present invention is also directed to an article selected from the group consisting of filtration media (filter), diapers, sanitary napkins, panty liners, incontinence products for adults, protective clothing, surgical drapes, surgical gown, and surgical wear in general, comprising the melt-blown fibers and/or the melt-blown web (MBW), preferably in an amount of at least 80.0 wt %, more preferably in an amount of at least 95.0 wt %, based on the total weight of the article. In one embodiment of the present invention, the article consists of the melt-blown fibers and/or the melt-blown web (MBW).

The weight per unit area of the melt-blown web depends very much on the end use, however it is preferred that the melt-blown web has a weight per unit area of at least 1 $g/m^2$, preferably in the range from 1 to 250 $g/m^2$.

In case the melt-blown web according to the instant invention is produced as a single layer web (e.g. for air filtration purposes) it has a weight per unit area of at least 5 $g/m^2$, more preferably of at least 10 $g/m^2$, yet more preferably in the range of 5 to 250 $g/m^2$, still more preferably in the range of 10 to 200 $g/m^2$.

In case the melt-blown web according to the instant invention is produced as one part of a multi-layer construction like an SMS-web comprising, preferably consisting of, a spunbonded web layer, a melt-blown web layer and another spunbonded web layer (e.g. for hygienic application), the melt-blown web has a weight per unit area of at least 0.8 $g/m^2$, more preferably of at least 1 $g/m^2$, yet more preferably in the range of 1 to 30 $g/m^2$, still more preferably in the range of 1.3 to 20 $g/m^2$. Alternatively, the multi-layer construction can also include a multiplicity of melt-blown web layers and spunbonded web layers, such as a SSMMS construction.

It is appreciated that the melt-blown web according to the instant invention has an improved or optimized relation between pressure drop and hydrohead, wherein the improvement or optimization is preferably obtained at an air permeability in the range from 500 to 2000 mm/s.

Thus, the improved or optimized relation between pressure drop and hydrohead of a melt-blown web is preferably expressed by a ratio of pressure drop (PD-web) to hydrohead (HH-web) [(PD-web) / (HH-web)] of ≤0.88, preferably ≤0.85, more preferably ≤0.82, even more preferably ≤0.8 and most preferably in the range from 0.4 to 0.88, wherein (PD-web) is the pressure drop (Pa), measured according to DIN ISO 9237, of a melt-blown web having a weight per unit area of 9.5 ±1.0 g/m², and the air permeability is in the range from 500 to 2000 mm/s, (HH-web) is the hydrohead ($3^{rd}$ drop, cm $H_2O$, resp. mbar), measured according to standard test WSP 80.6 (09), of a melt-blown web having a weight per unit area of 9.5 ±1.0 g/m².

It is furthermore appreciated that the melt-blown web according to the instant invention has improved thermo-mechanical properties.

Melt-blown webs according to the instant invention show at the same melt temperatures and same web weights higher force at break values, in machine direction as well as in transverse direction, compared to melt-blown webs produced from polypropylene compositions not containing a polymeric nucleating agent.

This effect is even more pronounced at higher application temperatures.

Furthermore, the present invention is directed to the use of the polypropylene composition according to the present invention for the preparation of melt-blown fibers (MBF), a melt-blown web (MBW) or an article as defined herein.

According to another aspect, the present invention is directed to the use of the polypropylene composition as defined herein for improving the relation between pressure drop and the hydrohead of a melt-blown web at an air permeability in the range from 500 to 2000 mm/s and at the same time the thermo-mechanical properties.

In particular, the improvement of the of the relation between pressure drop and hydrohead is defined by inequation (I)

$$(PD\text{-web})/(HH\text{-web}) \leq 0.88 \quad (I)$$

wherein (PD-web) is the pressure drop (Pa), measured according to DIN ISO 9237, of a melt-blown web having a weight per unit area of 9.5±1.0 g/m², (HH-web) is the hydrohead ($3^{rd}$ drop, cm $H_2O$, resp. mbar), measured according to standard test WSP 80.6 (09), of a melt-blown web having a weight per unit area of 9.5±1.0 g/m².

Preferably, the improvement of the relation between pressure drop and hydrohead is defined by inequation (Ia), more preferably inequation (Ib), still more preferably inequation (Ic), $$(PD\text{-web})/(HH\text{-web}) \leq 0.88 \quad (Ia)$$

$$(PD\text{-web})/(HH\text{-web}) \leq 0.85 \quad (Ib)$$

$$(PD\text{-web})/(HH\text{-web}) \leq 0.83 \quad (Ic)$$

wherein (PD-web) is the pressure drop (Pa), measured according to DIN ISO 9237, of a melt-blown web having a weight per unit area of 9.5±1.0 g/m², (HH-web) is the hydrohead ($3^{rd}$ drop, cm $H_2O$, resp. mbar), measured according to standard test WSP 80.6 (09), of a melt-blown web having a weight per unit area of 9.5±1.0 g/m².

The thermo-mechanical properties of the webs are also improved, i.e. the webs show higher tensile parameters in machine as well as in transverse direction and reduced elongation at elevated temperatures than webs produced with non-nucleated polypropylene composition.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e} = (I_{e6} + I_{e8})/2$

The amount of 1,2 primary inserted propene was quantified based on the methyl region with correction undertaken for sites included in this region not related to primary insertion and for primary insertion sites excluded from this region:

$P_{12} = I_{CH3} + P_{12e}$

The total amount of propene was quantified as the sum of primary inserted propene and all other present regio-defects:

$P_{total} = P_{12} + P_{21e}$

The mole percent of 2,1 erythro regio-defects was quantified with respect to all propene:

$[21e]$ mol.-% = $100*(P_{21e}/P_{total})$

MFR$_2$ (230° C.) is measured according to ISO 1133 (230° C., 2.16 kg load)

The xylene soluble fraction at room temperature (XS, wt %): The amount of the polymer soluble in xylene is determined at 25° C. according to ISO 16152; 5$^{th}$ edition; 2005-07-01.

DSC analysis, melting temperature ($T_m$), melting enthalpy ($H_m$), crystallization temperature ($T_c$) and crystallization enthalpy ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and crystallization enthalpy ($H_c$) are determined from the cooling step, while melting temperature ($T_m$) and melting enthalpy ($H_m$) are determined from the second heating step respectively from the first heating step in case of the webs.

Grammage of the Web

The unit weight (grammage) of the webs in g/m$^2$ was determined in accordance with ISO 536:1995.

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Hydrohead

The hydrohead or water resistance as determined by a hydrostatic pressure test is determined according to the WSP (worldwide strategic partners) standard test WSP 80.6 (09) as published in December 2009. This industry standard is in turn based on ISO 811:1981 and uses specimens of 100 cm$^2$ at 23° C. with purified water as test liquid and a rate of increase of the water pressure of 10 cm/min. An H$_2$O column height of X cm in this test corresponds to a pressure difference of X mbar.

Air Permeability

The air permeability was determined in accordance with DIN ISO 9237 at a pressure difference of 100 Pa. This air permeability is defined as the velocity of an air flow passing perpendicularly through the web specimen.

Filtration Efficiency

Air filtration efficiency was determined based on EN 1822-3 for flat sheet filter media, using a test filter area of 400 cm$^2$. The particle retention was tested with a usual aerosol of di-ethyl-hexyl-sebacate (DEHS), calculating efficiency for the fraction with 0.4 μm diameter from a class analysis with 0.1 μm scale. An airflow of 16 m$^3 \cdot$h$^{-1}$ was used, corresponding to an airspeed of 0.11 m·s$^{-1}$.

Pressure Drop

The pressure drop was measured according to DIN ISO 9237 at an air speed (permeability) of 500 mm/s.

Tensile Tests on Webs

The tests were performed in line with the Edana standard WSP 11 110.4 (09) related to ISO/DIS 9073-5 using 10 samples of 500 mm width. The distance of the clamps at the start of test was 100 mm, the test speed was constant for whole test at 100 mm/min. All parameters (in machine and transverse direction) were determined at 23° C., while only the maximum force and related strain at maximum force (both in machine direction) were also determined at 80° C.

B. Examples

The catalyst used in the polymerization process for the propylene homopolymer of the inventive example (IE) and the Comparative Example (CE) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and cyclohexylmethyl dimethoxy silane (C-Donor) or di(cyclopentyl) dimethoxy silane (D-donor) as donor.

The aluminium to donor ratio, the aluminium to titanium ratio and the polymerization conditions are indicated in tables 1 and 2.

Polymerization was performed in a Borstar pilot plant, comprising a loop reactor and a gas phase reactor.

TABLE 1

Preparation of the propylene homopolymer (Component (A))

|  |  | Component (A) |
|---|---|---|
| Donor | type | C |
| TEAL/Ti | [mol/mol] | 150 |
| TEAL/Donor | [mol/mol] | 18.8 |
| Loop (H-PP1) | | |
| Time | [h] | 0.66 |
| Temperature | [° C.] | 75 |
| Pressure | [kPa] | 5200 |
| MFR$_2$ | [g/10 min] | 77.0 |
| XCS | [wt.-%] | 4.9 |
| H$_2$/C3 ratio | [mol/kmol] | 7.2 |
| amount | [wt.-%] | 100 |
| 1st GPR (H-PP2) | | |
| Time | [h] | — |
| Temperature | [° C.] | — |
| H$_2$/C3 ratio | [mol/kmol] | — |
| amount | [wt.-%] | 0 |
| Final | | |
| MFR$_2$ | [g/10 min] | 79 |
| XCS | [wt.-%] | 4.9 |
| Tm | [° C.] | 162.6 |
| Tc | [° C.] | 122.4 |
| 2, 1 | [—] | n.d. |
| mmmm | [%] | 93.5 |

The propylene homopolymer has been mixed with 400 ppm calcium Stearate (CAS No. 1592-23-0) and 1,000 ppm Irganox 1010 supplied by BASF AG, Germany (Pentaerythrityl-tetrakis(3-(3′,5′-di-tert. butyl-4-hydroxyphenyl)-propionate, CAS No. 6683-19-8).

In a second step the propylene homopolymer has been visbroken by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target MFR$_2$ of 800 g/10 min.

The visbroken propylene homopolymer was used as such in the Comparative Examples.

For the Inventive Examples the visbroken propylene homopolymer was compounded with a masterbatch containing the polymeric nucleating agent and a propylene homopolymer as carrier.

The masterbatch was obtained by polymerizing propylene in the presence of a catalyst, prepared as described above, with an additional modification step.

Before the polymerization, the catalyst, prepared as described above, was prepolymerized with vinyl cyclohexane in an amount to achieve a concentration of 120 ppm poly(vinyl cyclohexane) (PVCH) in the final polymer. The respective process is described in EP 1 028 984 and EP 1 183 307.

The polymerization of the carrier polymer containing the polymeric nucleating agent was performed in a Borstar pilot plant, comprising a loop reactor and a gas phase reactor.

TABLE 2

Preparation of the carrier polymer containing the polymeric nucleating agent (masterbatch)

| Prepoly | | |
|---|---|---|
| Donor | type | D |
| TEAL/Ti | [mol/mol] | 150 |
| TEAL/Donor | [mol/mol] | 18.8 |
| Time | [h] | 0.38 |
| Temperature | [° C.] | 30 |
| Pressure | [kPa] | 5500 |
| Loop (H-PP1) | | |
| Time | [h] | 0.5 |
| Temperature | [° C.] | 80 |
| Pressure | [kPa] | 5200 |
| MFR$_2$ | [g/10 min] | 0.5 |
| XCS | [wt.-%] | 1.0 |
| H$_2$/C3 ratio | [mol/kmol] | 0.18 |
| split | [wt %] | 56.0 |
| 1st GPR (H-PP2) | | |
| Time | [h] | 1.5 |
| Temperature | [° C.] | 80 |
| Pressure | [kPa] | 2500 |
| H$_2$/C3 ratio | [mol/kmol] | 79.8 |
| split | [wt %] | 44.0 |

The propylene homopolymer has been mixed with 0.15 wt % of Irganox B 215 FF (supplied by BASF) and 0.15 wt % of Calcium stearate (CAS No. 1592-23-0) and pelletised.

The so obtained pellets had an MFR of 6.5, a Tc of 129° C. and an isotacticity of 97.2 mol % as determined by $^{13}$C-NMR spectroscopy.

For the Inventive Examples 95 wt % of the visbroken propylene homopolymer obtained as described above were compounded with 5 wt % of the masterbatch, prepared as described above. Melt mixing in a co-rotating twin-screw extruder at 200-230° C. was used for this purpose.

The polypropylene compositions (CE only propylene homopolymer; IE propylene homopolymer+masterbatch) have been converted into melt-blown webs on a Reicofil MB250 line using a spinneret having 470 holes of 0.4 mm exit diameter and 35 holes per inch. Webs were produced at different melt temperatures, throughputs, DCD (die to collector distance) and air volumes.

The processing conditions for and properties of the melt-blown webs are indicated in tables 3 4, 5 and 6.

TABLE 3

Processing conditions for the production of the melt-blown webs

| Example | Melt Temperature ° C. | DCD mm | Air volume m$^3$/h | Throughput kg/h · m | Web weight g/m$^2$ |
|---|---|---|---|---|---|
| IE1-1 | 250 | 500 | 550 | 30 | 9.1 |
| IE1-2 | 250 | 200 | 350 | 30 | 9.6 |
| IE1-3 | 250 | 200 | 450 | 10 | 9.8 |
| IE2-1 | 270 | 500 | 520 | 30 | 9.3 |
| IE2-2 | 270 | 200 | 480 | 30 | 9.7 |
| IE2-3 | 270 | 200 | 350 | 15 | 9.4 |
| IE2-4 | 270 | 200 | 310 | 10 | 9.5 |
| IE3-1 | 290 | 200 | 300 | 25 | 9.6 |
| IE3-2 | 290 | 200 | 320 | 30 | 9.6 |
| CE1-1 | 250 | 500 | 450 | 10 | 8.3 |
| CE1-2 | 250 | 200 | 410 | 10 | 9.5 |
| CE2-1 | 270 | 500 | 470 | 30 | 10.0 |

TABLE 3-continued

Processing conditions for the production of the melt-blown webs

| Example | Melt Temperature ° C. | DCD mm | Air volume m³/h | Throughput kg/h · m | Web weight g/m² |
|---|---|---|---|---|---|
| CE2-2 | 270 | 200 | 430 | 30 | 10.0 |
| CE2-3 | 270 | 200 | 350 | 15 | 9.9 |
| CE3-1 | 290 | 500 | 380 | 40 | 9.9 |
| CE3-2 | 290 | 200 | 240 | 35 | 10.0 |
| CE3-3 | 290 | 200 | 250 | 40 | 10.0 |
| CE3-4 | 290 | 200 | 230 | 30 | 10.0 |

TABLE 4

Properties of the melt-blown webs

| Example | Air permeability mm/s | Pressure drop Pa | Filtration Efficiency % | Quality factor 100/Pa | Hydrohead (3$^{rd}$ drop) cm H$_2$O* |
|---|---|---|---|---|---|
| IE1-1 | 2340 | 12.9 | 19.04 | 1.644 | 26.4 |
| IE1-2 | 1342 | 30.5 | 17.64 | 0.639 | 48.6 |
| IE1-3 | 1102 | 42.3 | 18.16 | 0.474 | 64.7 |
| IE2-1 | 1947 | 22.3 | 15.2 | 0.742 | 38.3 |
| IE2-2 | 1029 | 46.2 | 19.92 | 0.481 | 62.7 |
| IE2-3 | 874 | 42.7 | 18.37 | 0.477 | 67.1 |
| IE2-4 | 795 | 51.7 | 22.52 | 0.494 | 76.3 |
| IE3-1 | 761 | 58.1 | 28.06 | 0.567 | 83.4 |
| IE3-2 | 701 | 57.7 | 24.76 | 0.495 | 96.5 |
| CE1-1 | 1646 | 22.1 | 21.68 | 1.106 | 40.3 |
| CE1-2 | 952 | 44.3 | 25.47 | 0.664 | 74.7 |
| CE2-1 | 1069 | 27.1 | 14.47 | 0.709 | 44.8 |
| CE2-2 | 792 | 50.3 | 25.2 | 0.58 | 78.7 |
| CE2-3 | 753 | 55.3 | 21.83 | 0.445 | 82.1 |
| CE3-1 | 1184 | 35.3 | 24.07 | 0.78 | 56.2 |
| CE3-2 | 875 | 43.9 | 21.47 | 0.552 | 58.8 |
| CE3-3 | 879 | 48.0 | 18.45 | 0.425 | 60.1 |
| CE3-4 | 931 | 43.2 | 19.71 | 0.511 | 66.8 |

*also mbar

FIG. 1 summarizes the melt-blown web performance with regard to the relation between pressure drop and hydrohead at a weight per unit area of 9.5±1.0 g/m² by adapting process conditions with respect to inventive example IE and CE.

From FIG. 1, it can be concluded that the melt-blown webs obtained from inventive Example IE show an improved or optimized relation between pressure drop and hydrohead. It clearly shows that the hydrohead can go higher for the inventive composition than for the comparative composition.

TABLE 5

DSC of IE and CE on web

| | Melt Temp./° C. | Tm(web, 1$^{st}$ heat)/J/g | Hm (web, 1$^{st}$ heat)/J/g | Tc/° C. |
|---|---|---|---|---|
| IE1-1 | 250 | 164 | 87 | 125 |
| IE2-1 | 270 | 163 | 105 | 126 |
| CE1-1 | 250 | 164 | 87 | 115 |
| CE2-2 | 270 | 162 | 80 | 116 |

Table 5 shows the DSC results of inventive and comparative examples on webs. The Tc is 125° C. with BNT and 115° C. without BNT. Thus, the PVCH addition increases Tc by 10° C., a clear indication of good dispersion and high nucleation efficiency of BNT, even at extremely lower concentration (ca. 1 ppm). Under the process condition, the webs also have a higher Hm, especially at higher melting temperature, meaning the crystallinity is higher.

TABLE 6

Mechanical properties

| | | | 1E1-3 | 1E2-2 | 1E3-1 | CE1-2 | CE2-2 |
|---|---|---|---|---|---|---|---|
| Tensile MD (23° C.) | Force at break | N | 7.1 | 7.7 | 8.1 | 6.6 | 5.7 |
| | Max. force | N | 8.0 | 9.0 | 8.3 | 8.0 | 7.6 |
| | Rel. force at break | N/cm | 1.4 | 1.5 | 1.6 | 1.3 | 1.1 |
| | Rel. max. force | N/cm | 1.6 | 1.8 | 1.7 | 1.6 | 1.5 |
| | Strain at break | % | 28.8 | 22.7 | 11.1 | 24.6 | 29.5 |
| | Strain at max. force | % | 26.3 | 20.8 | 10.6 | 22.4 | 26.8 |
| Tensile TD (23° C.) | Force at break | N | 5.6 | 4.5 | 3.2 | 3.7 | 3.8 |
| | Max. force | N | 6.1 | 5.5 | 3.9 | 5.3 | 5.6 |
| | Rel. force at break | N/cm | 1.1 | 0.9 | 0.6 | 0.7 | 0.8 |
| | Rel. max. force | N/cm | 1.2 | 1.1 | 0.8 | 1.1 | 1.1 |
| | Strain at break | % | 39.8 | 37.2 | 27.6 | 43.5 | 48.9 |
| | Strain at max. force | % | 36.5 | 34.3 | 24.4 | 39.4 | 42.5 |
| Tensile MD (80° C.) | Max. force | N | 2.9 | 3.3 | 3.0 | 3.3 | 3.0 |
| | Strain at force | % | 32.2 | 27.3 | 13.2 | 26.6 | 31.0 |

FIG. 2 shows the mechanical properties of the webs. At the same melt temperature and web weight, BNT improves the mechanical properties in both TD and MD direction, and the effect is even more pronounced at the higher application (testing) temperature of 80° C., in line with the DSC results discussed above (see Table 6).

What is claimed is:

1. A polypropylene composition suitable for the production of meltblown PP fibers comprising:
   (A) a propylene homopolymer, produced with a Ziegler-Natta catalyst (ZN-C), and
   (B) a polymeric nucleating agent,
   wherein the polypropylene composition has
   i) a melt flow rate MFR$_2$ (230° C./2.16 kg) measured according to ISO 1133 of 90 to 5000 g/10 min, and
   ii) a difference between melting temperature (Tm) and crystallization temperature (Tc), (Tm–Tc) of <45° C., and
   wherein the propylene homopolymer has been visbroken and has an MFR$_2$ of 400 to 3000 g/10 min.

2. The polypropylene composition according to claim 1, wherein the polypropylene composition is free of phthalic compounds as well as their respective decomposition products.

3. The polypropylene composition according to claim 1, wherein the polypropylene composition has been visbroken.

4. The polypropylene composition according to claim 3, wherein the propylene homopolymer has been visbroken with a visbreaking ratio [final MFR$_2$ (230° C./2.16 kg)/initial MFR$_2$ (230° C./2.16 kg)] of 5 to 50, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking.

5. The polypropylene composition according to claim 1, wherein the polypropylene composition, propylene homopolymer, or polypropylene composition and propylene homopolymer have one or more of:

a) 2,1 erythro regio-defects of equal or below 0.4 mol % determined by $^{13}$C-NMR spectroscopy,
b) a pentad isotacticity (mmmm) of more than 90.0%,
c) a xylene cold soluble content (XCS) determined according ISO 16152 (25° C.) of at least 1.8 wt %, and
d) a crystallization temperature Tc of ≥110° C.

6. The polypropylene composition according to claim 1, wherein the polymeric nucleating agent is a compound of the formula

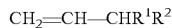

wherein $R^1$ and $R^2$ together form a 5- or 6-membered saturated, unsaturated or aromatic ring, optionally containing substituents, or independently represent an alkyl group comprising 1 to 4 carbon atoms, whereby in case $R^1$ and $R^2$ form an aromatic ring, the hydrogen atom of the CHR$^1$R$^2$ moiety is not present.

7. The polypropylene composition according to claim 6, wherein the polymeric nucleating agent is a vinyl cycloalkane polymer selected from the group consisting of vinyl cyclohexane (VCH) polymer, vinyl cyclopentane polymer, 3-methyl-1-butene polymer and vinyl-2-methyl cyclohexane polymer.

8. The polypropylene composition according to claim 1, wherein the propylene homopolymer has been polymerized in the presence of
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;
b) optionally a co-catalyst (Co), and
c) optionally an external donor (ED).

9. The polypropylene composition according to claim 8, wherein
a) the internal donor (ID) is selected from the group consisting of optionally substituted malonates, maleates, succinates, glutarates, cyclohexene-1,2-dicarboxylates, benzoates, derivatives thereof and mixtures thereof; and
b) the molar-ratio of co-catalyst (Co) to external donor (ED) [Co/ED] is 5 to 45.

10. The polypropylene composition according to claim 1, wherein the propylene homopolymer is produced in a polymerization process comprising at least one reactor (R1) or at least two reactors (R1) and (R2), whereby in the first reactor (R1) a first propylene homopolymer fraction (H-PP1) is produced and subsequently transferred into the second reactor (R2), in the second reactor (R2) a second propylene homopolymer fraction (H-PP2) is produced in the presence of the first propylene homopolymer fraction (H-PP1).

11. The polypropylene composition according to claim 1, wherein the polymeric nucleating agent is introduced to the propylene homopolymer (A) by mechanically blending the propylene homopolymer (A) with a carrier polymer containing the polymeric nucleating agent.

12. The polypropylene composition according to claim 11, wherein the carrier polymer containing the polymeric nucleating agent is obtained by preparing a propylene polymer using a modified polymerization catalyst, which modified polymerization catalyst is obtained by polymerizing a Ziegler-Natta polymerization catalyst with a vinyl compound of the formula CH$_2$=CH—CHR$^1$R$^2$, wherein the Ziegler-Natta polymerization catalyst comprises compounds (TC) of a transition metal of Group 4 to 6 of IUPAC, a Group 2 metal compound (MC) and an internal donor (ID), wherein said internal donor (ID) is a non-phthalic compound; and
wherein $R^1$ and $R^2$ together form a 5- or 6-membered saturated, unsaturated or aromatic ring, optionally containing substituents, or independently represent an alkyl group comprising 1 to 4 carbon atoms, whereby in case $R^1$ and $R^2$ form an aromatic ring, the hydrogen atom of the —CHR$^1$R$^2$ moiety is not present.

13. Melt-blown fibers having an average diameter of not more than 5.0 µm, said fibers comprising at least 95.0 wt % of a polypropylene composition as defined in claim 1.

14. Melt-blown web comprising the melt-blown fibers of claim 13.

15. An article comprising melt-blown fibers according to claim 13, wherein said article is selected from the group consisting of filtration media, diapers, sanitary napkins, panty liners, incontinence products for adults, protective clothing, breathing protection masks, surgical drapes, surgical gowns, and surgical wear.

16. A process for improving the relation between pressure drop and hydrohead of a melt-blown web at an air permeability in the range from 500 to 2000 mm/s, wherein the improvement is defined by inequation (I)

$$(\text{PD-web})/(\text{HH-web}) \leq 0.88 \quad (I)$$

wherein
(PD-web) is the pressure drop (Pa), measured according to DIN ISO 9237, of a melt-blown web having a weight per unit area of 9.5 ±1.0 g/m$^2$,
(HH-web) is the hydrohead (3rd drop, cm H2O), measured according to standard test WSP 80.6 (09), of a melt-blown web having a weight per unit area of 9.5 ±1.0g/m$^2$
by using a polypropylene composition comprising:
(A) a propylene homopolymer, produced with a Ziegler-Natta catalyst (ZN-C), and
(B) a polymeric nucleating agent,
wherein the polypropylene composition has
i) a melt flow rate MFR$_2$ (230 ° C./2.16 kg) measured according to ISO 1133 of 90 to 5000 g/10 min, and
ii) a difference between melting temperature (Tm) and crystallization temperature (Tc), (Tm-Tc) of <45° C., and
wherein the propylene homopolymer has been visbroken and has an MFR$_2$ of 400 to 3000 g/10 min.

17. An article comprising a melt-blown web according to claim 14, wherein said article is selected from the group consisting of filtration media, diapers, sanitary napkins, panty liners, incontinence products for adults, protective clothing, breathing protection masks, surgical drapes, surgical gowns, and surgical wear.

18. A process for improving the thermo-mechanical properties of a melt-blown web in machine direction (MD) and transverse direction (TD) by using a polypropylene composition comprising:
(A) a propylene homopolymer, produced with a Ziegler-Natta catalyst (ZN-C), and
(B) a polymeric nucleating agent,
wherein the polypropylene composition has
i) a melt flow rate MFR$_2$ (230 ° C./2.16 kg) measured according to ISO 1133 of 90 to 5000 g/10 min, and
ii) a difference between melting temperature (Tm) and crystallization temperature (Tc), (Tm-Tc) of <45° C., and
wherein the propylene homopolymer has been visbroken and has an MFR$_2$ of 400 to 3000 g/10 min.

* * * * *